July 3, 1962   W. A. CHARLEY   3,042,127
WEIGHING AND BAGGING MACHINE
Filed March 10, 1960

INVENTOR.
WALTER ALAN CHARLEY
BY
Arthur O. Andersen
Atty.

United States Patent Office 3,042,127
Patented July 3, 1962

3,042,127
WEIGHING AND BAGGING MACHINE
Walter Alan Charley, 400 Birch St., La Crescent, Minn.
Filed Mar. 10, 1960, Ser. No. 14,144
1 Claim. (Cl. 177—68)

This invention relates to weighing and bag filling machines. The machine is particularly suited for filling paper or plastic bags, but it may be used for filling other containers such as boxes.

Most weighing and bagging machines which have been devised and marketed in the past have a complicated and expensive structure and are so large and heavy that they are not easily moved and arranged.

It is an object of this invention to provide a weighing and bagging machine which can be easily moved from place to place and which is so simple in operation that it may be used by an inexperienced person after brief instructions.

It is an object of this invention to provide a weighing and bagging machine which can be used to place a predetermined weight of fruit, vegetables, or other material in bags of sizes which are used in marketing the material.

It is an object of this invention to provide a gate for controlling the feed of material to the weighing pan and means for automatically closing the gate when the weighing pan falls.

It is another object to provide a scale and registering pointer which indicates the amount of weight over and under that required.

It is another object to provide electrical means including a foot switch for retracting the gate to start a weighing cycle.

It is another object of the invention to provide means for holding the gate in closed position even though the pan is raised by removal of some of the material.

Another object of this invention is to provide a machine which accomplishes rapid weighing and bagging and which has such a simple mechanical structure that it is inexpensive to manufacture, assemble and repair.

Figure 1:
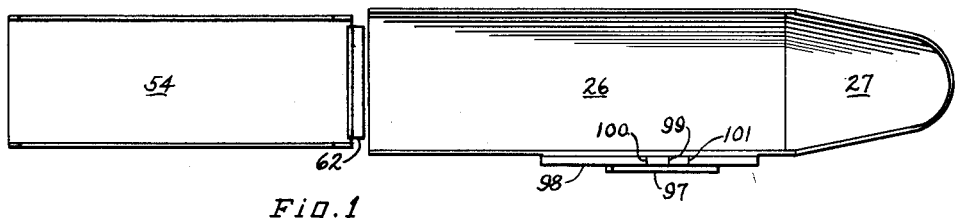
Figure 2:
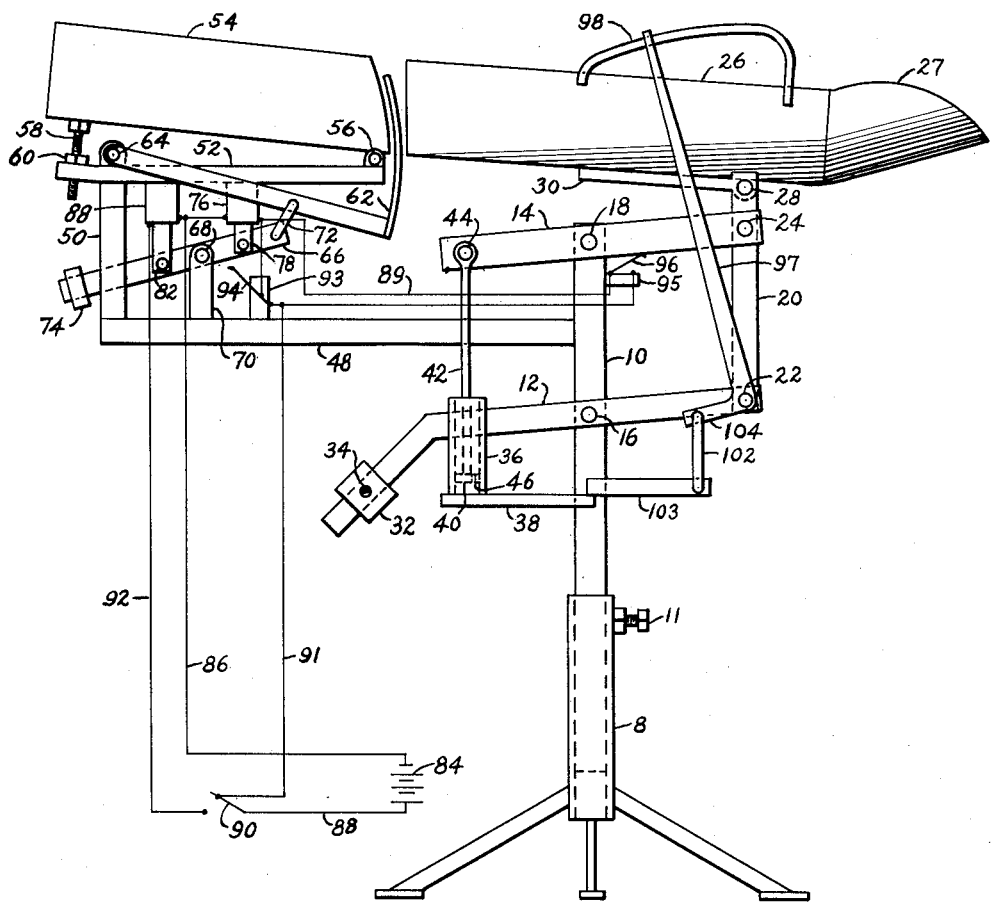

Other objects and advantages of my weighing and bagging machine will become apparent from the following description of a preferred form thereof and from the accompanying drawings in which:

FIG. 1 is a top plan view of the machine;
FIG. 2 is a side view of the machine showing the electrical control diagrammatically.

The machine has a pedestal 8 which adjustably slidably supports a post 10. A set screw 11 holds the post 10 in the desired adjusted position. Beams 12 and 14 are pivotally mounted on the post 10 by bearings 16 and 18 respectively which are preferably of the frictionless roll type. A link 20 is pivotally mounted on beams 12 and 14 by bearings 22 and 24 which are preferably of the frictionless roll type. A pan 26 is pivotally secured to the link 20 at 28. A pan 26 having a spout 27 normally rests upon the arm 30 which extends angularly from the link 20.

A weight 32 is adjustably mounted on the beam 12 and may be held in adjusted position by set screw 34. This adjustment may be made according to the weight of material to be weighed.

A dash pot cylinder 36 is mounted on an arm 38 which is secured to the post 10. A piston 40 operates in cylinder 36 and is secured to a rod 42 which is pivotally mounted on beam 14 at 44. Piston 40 has a small hole 46 extending therethrough. The cylinder 36 contains oil. In order for piston 40 to move in the cylinder 36 oil must flow through the hole 46. The rate of movement of the piston 40 is therefore controlled. The rate of pivotal movement of beam 14 is therefore retarded, because it is connected by rod 42 to the piston 40. In this manner the beam 14 does not bounce back when the pan descends because of the weight of the material in it.

An arm 48 is secured to post 10 and extends horizontally therefrom. A post 50 is secured to arm 48 and extends upwardly therefrom. An arm 52 is secured to the upper end of the post 50. A chute 54 is pivotally secured to the arm 52 at 56. A screw 58 is in threaded engagement with arm 52 at one end and supports the chute 54 at its other end. The screw 58 may be adjusted with respect to the arm 52 to adjust the slope of the chute 54. A nut 60 may be tightened to hold the screw 58 in adjusted position. A gate 62 is pivotally mounted on post 50 at 64.

A lever 66 is pivotally secured at 68 to a post 70 secured to arm 48. The lever 66 is connected to the gate 62 by a link 72 which is pivotally secured to lever 66 and gate 62. A weight 74 is mounted on the lever 66 to counterbalance the weight of the gate 62.

A solenoid 76 is mounted on arm 52 and has its armature pivotally secured at 78 to lever 66. When energized solenoid 76 moves gate 62 into closing position with respect to chute 54. A second solenoid 80 is secured to arm 52 and has its armature pivotally secured at 82 to lever 66. When solenoid 80 is energized it moves gate 62 into open position out of the path of the material in chute 54.

The control mechanism for the solenoids 76 and 80 will now be described. Numeral 84 designates a source of electrical energy. Wire 86 connects the source of energy 84 to solenoids 76 and 80. The other side of the source of electrical energy is connected by wire 88 to a foot switch 90 which normally contacts wire 91. When the foot switch 90 is depressed it makes contact between wire 88 and wire 92 which is connected to solenoid 80. Wire 91 is connected to a switch 93 which is connected to solenoid 76. The blade 94 of switch 93 is moved by lever 66 when lever 66 moves clockwise thus opening switch 93.

Wire 91 is connected to switch 95 which has a blade 96 normally in open position. When the weight of material in the pan 26 reaches the desired predetermined amount the beam 14 moves clockwise to engage and move blade 96 to close switch 95. Switch 95 is connected to solenoid 76 by wire 89. When switch 95 is closed solenoid 76 is energized through wire 88, switch 90, wires 91, 89, and 86. Energization of solenoid 76 moves lever 66 counterclockwise to move gate 62 to closing position. Counterclockwise movement of lever 66 allows blade 94 to move to close switch 93 to maintain energization of solenoid 76 independent of switch 95.

An indicating arm 97 is pivotally mounted on bearing 22 and is in indicating position with respect to an over and under scale 98 secured to the pan 26. The scale 98 has a line 99 indicating the desired weight and lines 100 and 101 indicating the allowable tolerances. A link 102 is pivotally secured to one end to an arm 103 secured to the post 10 and at the other end to a flange 104 on the indicating arm 97.

The operation of the machine will now be described. It will be assumed that the material to be bagged consists of apples. The machine is placed in position with respect to a supply of apples so that the apples accumulate in the chute 54. The apples may be moved on an endless belt having a dam which directs the moving apples into the chute 54. The operator depresses the foot switch 90 long enough to energize solenoid 80 through wires 88, 92, and 86. Energization of solenoid 80 acting through lever 66 and link retracts the gate 62 permitting apples to flow by gravity from chute 54 to pan 26. When the weight of apples in the pan 26 reaches the desired amount, the pan 26 descends and lever 18 engages blade 96 to close switch 95 and energize solenoid 76 to close the gate 62. Movement of gate 62 to closed position allows switch 93 to close to maintain energization of solenoid 76 even though switch 95 is opened by removal of one of the apples from the pan. The operator now observes the position of the indicating arm 97 with respect to tolerance lines 100 and 101. If the indicator is outside of the line 101 indicating an excess weight, the operator may remove a large apple and replace it with a smaller apple to bring the weight within the tolerance lines 100 and 101. The operator now holds a bag over the spout 27 and pivots the pan 26 clockwise as viewed in FIG. 2 to allow the apples to descend gently by gravity into the bag.

Although I have described a specific embodiment of my invention, it is comtemplated that various changes may be made therein without departing from the scope of the invention and I desire to be limited only by the claim.

I claim:

A weighing machine comprising, a support, beam scale means pivotally mounted on said support, an elongated pan having an open end adapted to receive material to be weighed, means pivotally mounting said pan on said beam scale means, a stop on said beam scale means engageable with said pan to limit pivotal movement of said pan to a position slightly inclined downwardly from its open end, an indicating arm pivotally mounted on said beam scale, means connecting said arm to said support for swinging said indicating arm about its pivot in response to movement of said beam scale means and an indicating scale on said pan in indicating relationship to said indicating arm.

References Cited in the file of this patent

UNITED STATES PATENTS

| | | |
|---|---|---|
| 363,468 | Kent | May 24, 1887 |
| 560,543 | Richards | May 19, 1896 |
| 649,936 | Kann | May 22, 1900 |
| 749,216 | McNear | Jan. 12, 1904 |
| 901,297 | Jaenichen | Oct. 13, 1908 |
| 2,408,906 | Bocchicchio | Oct. 8, 1946 |
| 2,451,891 | Vagim | Oct. 19, 1948 |
| 2,610,726 | Howard | Sept. 16, 1952 |
| 2,619,200 | Pezoic | Nov. 25, 1952 |
| 2,657,003 | Belmont | Oct. 27, 1953 |
| 2,709,546 | Shore | May 31, 1955 |
| 2,760,748 | Ahlburg | Aug. 28, 1956 |
| 2,839,288 | Hadley | June 17, 1958 |

FOREIGN PATENTS

| | | |
|---|---|---|
| 1,303 | Great Britain | May 26, 1860 |